United States Patent [19]

Seki

[11] Patent Number: 4,938,187

[45] Date of Patent: Jul. 3, 1990

[54] FUEL CONTROL APPARATUS FOR ENGINE

[75] Inventor: Yasunari Seki, Utsunomiya, Japan

[73] Assignee: Honda Giken Kogyo Kabushiki Kaisha, Tokyo, Japan

[21] Appl. No.: 386,662

[22] Filed: Jul. 31, 1989

[30] Foreign Application Priority Data

Aug. 1, 1988 [JP] Japan .................................. 63-192245

[51] Int. Cl.$^5$ ........................ F02D 17/02; F01L 1/34
[52] U.S. Cl. ................................. 123/333; 123/90.16; 123/493
[58] Field of Search ............... 123/333, 345, 346, 347, 123/348, 90.15, 90.16, 493

[56] References Cited

U.S. PATENT DOCUMENTS

| | | | |
|---|---|---|---|
| 3,735,742 | 5/1973 | Aono et al. | 123/333 |
| 4,494,506 | 1/1985 | Hayama et al. | 123/348 |
| 4,534,323 | 8/1985 | Kato et al. | 123/90.16 |
| 4,638,781 | 1/1987 | Shiki et al. | 123/333 |
| 4,651,684 | 3/1987 | Masuda et al. | 123/348 |
| 4,727,831 | 3/1988 | Nagahiro et al. | 123/90.16 |
| 4,788,946 | 12/1988 | Inoue et al. | 123/90.16 |

FOREIGN PATENT DOCUMENTS 0090718  5/1984  Japan .................................. 123/348

Primary Examiner—Tony M. Argenbright
Assistant Examiner—Robert Mates
Attorney, Agent, or Firm—Armstrong, Nikaido, Marmelstein, Kubovcik & Murray

[57] ABSTRACT

A fuel control apparatus is provided for an engine which is primarily used for a vehicle so as to permit the changing of a valve opening-closing timing and/or a valve lift amount for a valve on at least one of an intake side and an exhaust side. Accordingly, to the present invention, the fuel supply to the engine can thus be properly adjusted or corrected in each of the operation ranges with different valve timings so as to improve engine drivability.

4 Claims, 3 Drawing Sheets

FUEL CONTROL APPARATUS FOR ENGINE

BACKGROUND OF THE INVENTION

This invention generally relates to a fuel control apparatus for an engine which is primarily used for a vehicle which permits the changing of a valve opening-closing timing and/or a valve-lift amount for a valve on at least one of an intake side and an exhaust side. This change of the valve opening-closing timing and/or the valve-lift amount will be generally referred to as the "change of valve timing".

An engine wherein the valve timing of the intake and exhaust valves can be switched over to a low-speed valve timing whereby a valve-open duration and a valve-lift amount are small and suitable for a low-speed revolution range and for a high speed valve timing where the valve-open duration and the valve-lift amount are large, and further suitable for a high-speed revolution range is known in Japanese Examined Patent Application Publication No. 33289/1974.

Japanese Unexamined Patent Application Publication No. 191426/1982 discloses a method having a no-load reference value which substantially conforms to a $P_B$ characteristic representing an intake negative pressure $P_B$ at each revolution speed of the engine when the engine with its transmission set in neutral is operated in such a manner that its revolution speed may be kept unchanged.

The method disclosed in the above-described publication further has a pressure sensor which detects an intake negative pressure employed as a load detecting means to detect the engine load, and wherein fuel supply to the engine is stopped in a range where the negative pressure detected is below the no-load reference value (i.e., closer to vacuum). Referred to as the no-load $P_B$ characteristic is an intake negative pressure necessary for generating an output that can make up for the friction loss of the engine. When this intake negative pressure is lower than the no-load characteristic, the engine performs a negative work in which the engine may be rotated by a counter driving torque from the driving wheel side so that the range wherein the negative pressure is lower than the no-load reference value is taken as a deceleration operation range and fuel supply to the engine is thus stopped.

In an engine permitting to change the valve timing, the no-load $P_B$ characteristic also changes with the change of the valve timing and is represented by line a at a low-speed valve timing and by line b at a high-speed valve timing shown in FIG. 3. A revolution speed range where the no-load $P_B$ is relatively low is different between an operation with the low-speed valve timing and an operation with the high-speed valve timing. Accordingly, if a predetermined operation range where the fuel supply is to be stopped is set so as to match with one of the just-described valve timings, the fuel supply to the engine is stopped in a relatively high load range when the engine is operating at the other valve timing, and the engine drivability thus deteriorates.

In the state of operation where the intake negative pressure is slightly higher than the no-load $P_B$, (i.e., when a vehicle is cruising at a low-load and at a constant speed) it is desirable to set the air-fuel ratio of the mixture somewhat to a leaner side than a theoretical air-fuel ratio for improving fuel economy. To this end, one alternative is a structural arrangement whereby a low-load reference value is set which is slightly higher than the no-load $P_B$ characteristic, and the fuel supply quantity to the engine is decreased in a low-load operation range where the intake negative pressure falls between the no-load reference value, as described above, and the low-load reference value. However, if this low-load operation range is set in conformity with one of the valve timings, the same above-described problem develops.

SUMMARY OF THE INVENTION

In view of the above-described drawbacks, the present invention has for its object to provide an apparatus capable of properly correcting the fuel supply without deteriorating drivability in an engine of the type which permits the changing of the valve timing.

In accordance with one embodiment of this invention, a fuel control apparatus is provided for an engine having a valve timing changing means capable of changing a valve opening-closing timing and/or a valve-lift amount for a valve on at least one of an intake side and an exhaust side. The fuel control apparatus includes a judgement means for judging whether or not the operating state of the engine has entered a predetermined operation range determined by an engine load and a revolution speed of the engine; a correction means for correcting the fuel supply to the engine when the operating state of the engine has entered the predetermined operation range; and a means for changing the predetermined operation range in accordance with the change of the valve opening-closing timing and/or the valve-lift amount.

The above-described predetermined operation range includes the deceleration operation range and the low-load operation range wherein the engine load is slightly higher in the later operation than in the former operation. The fuel supply is stopped in the deceleration operation range by the correction means and is decreased in the low-load operation range by the correction means in order to make the air-fuel mixture lean for an improved fuel economy.

The valve timing changing means generally includes a two-stage changeover means for switching the valve timing from one to the other between the low-speed and the high-speed levels. However, the valve timing changing can be one which can be continuously changed.

According to the present invention, an operation range for adjusting or correcting the fuel supply to the engine can be selected in accordance with the change of the valve timing in order that necessary fuel supply adjustment or correction can be made in an operation range selected to be suited for each valve timing. Consequently, the engine drivability becomes free from deterioration.

The foregoing and other objects, features and advantages of this invention will be apparent from the following, more particular, description of the preferred embodiments of this invention as illustrated in the accompanying drawings.

DETAILED DESCRIPTION OF THE PREFERRED EMBODIMENTS

Figure 1:
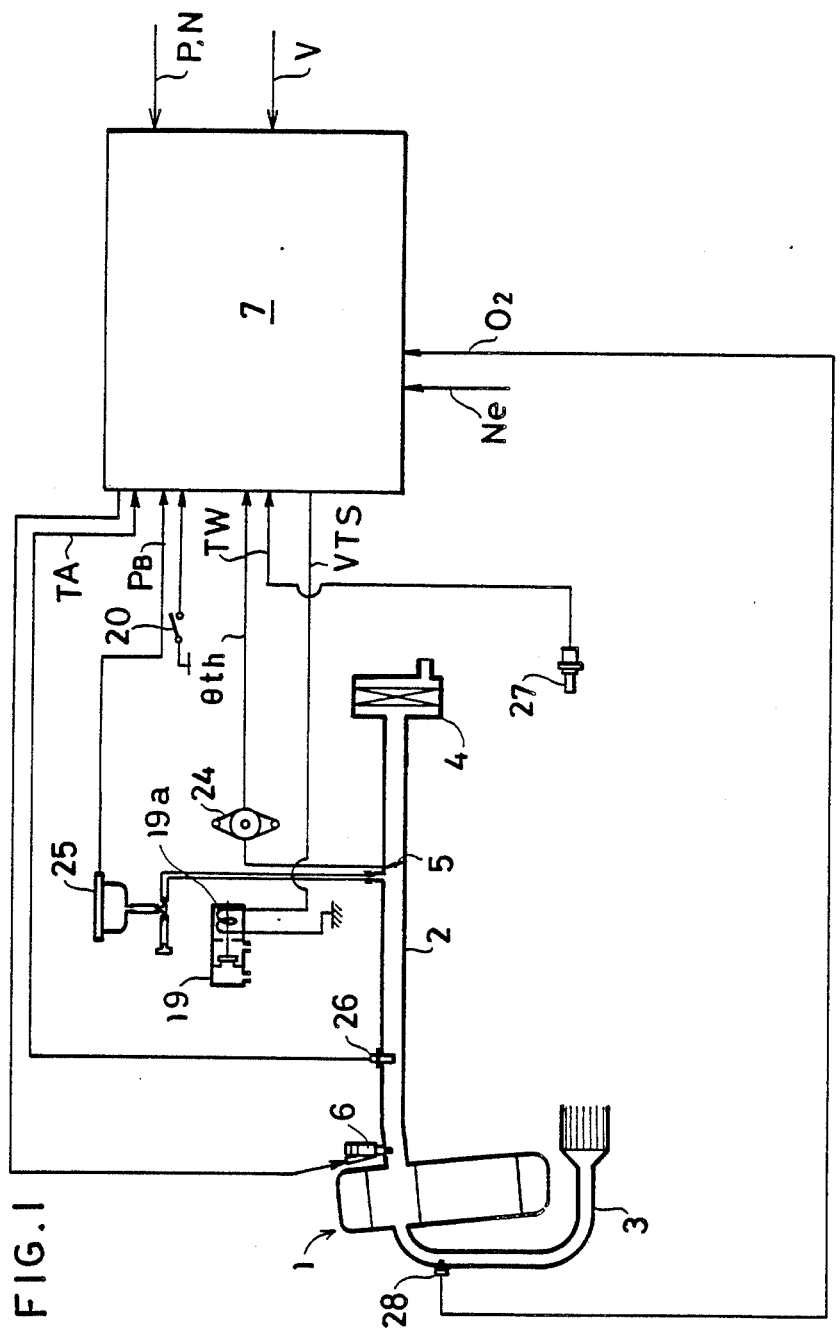
FIG. 1 is a system diagram of an engine to which the apparatus of the present invention is employed.

In reference to FIG. 1, reference numeral 1 generally refers to an engine body, reference number 2 denotes an intake passage, and reference number 3 designates an exhaust passage. The intake passage 2 is provided with an air cleaner 4, a throttle valve 5 and an injector 6 in that order from the upstream side of the intake passage 2, quantity of fuel injection made through the injector 6 is variably controlled by an electronic control circuit 7 so that the above-described engine is an electronically controlled fuel injection type.

Figure 2:
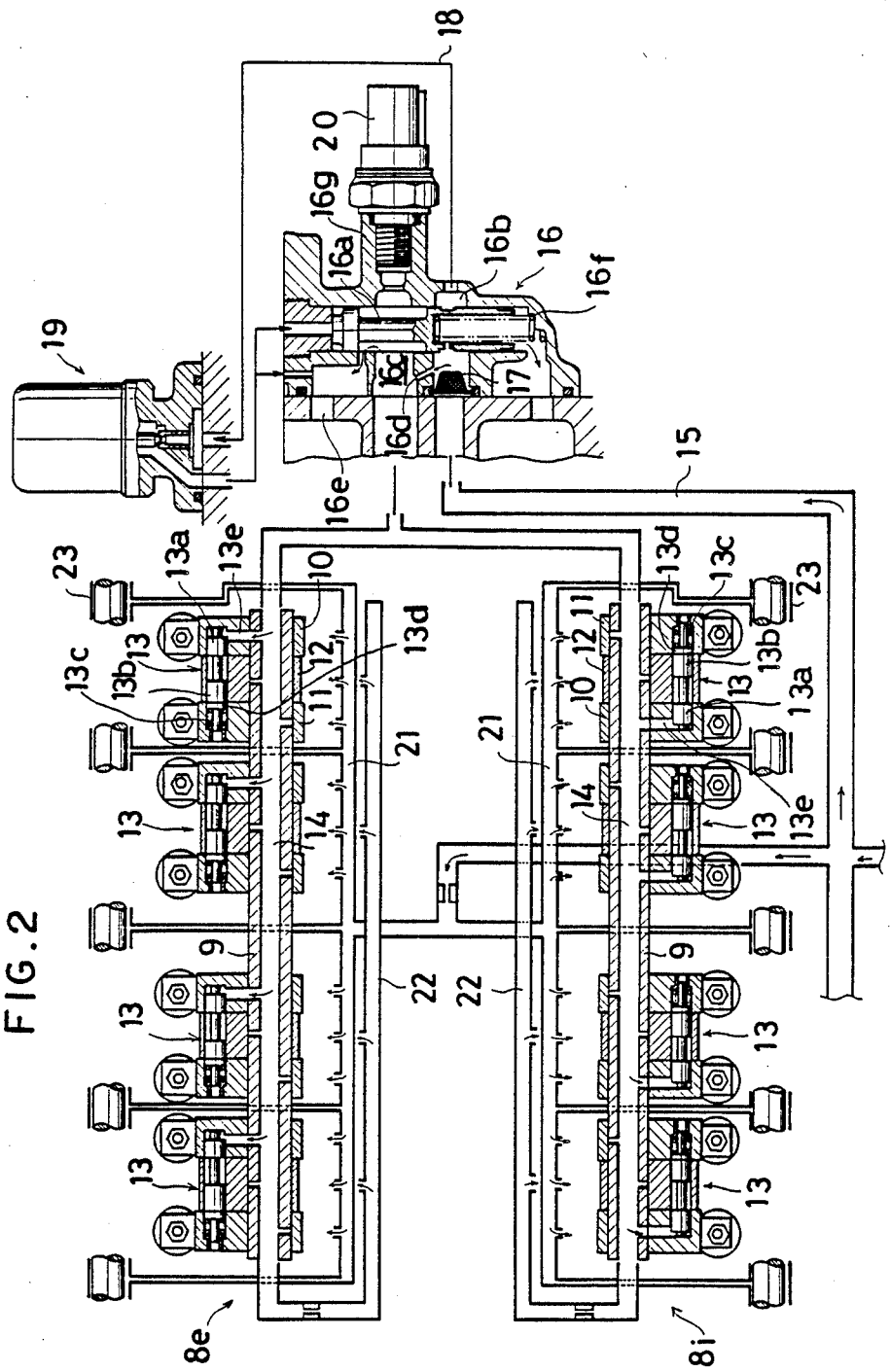
FIG. 2 shows a valve-timing changing means.

The engine used in this embodiment of the present invention is a double overhead cam (DOHC), in-line four-cylinder engine having a pair of intake and exhaust valves for each cylinder. As shown in FIG. 2, the engine further has a valve mechanism 8i at the intake valve side and another valve mechanism 8e at the exhaust valve side. The valve mechanisms are operated for driving the intake and exhaust valves to open and close.

Both the valve mechanisms 8i, 8e are basically of the same construction so that only a detailed explanation of the intake-side valve mechanism is provided hereinafter. It is noted that both of the valve mechanisms are assigned with the same symbols and reference numerals for their corresponding parts.

The intake-side valve mechanism 8i includes a rocker shaft 9 for the intake valve; and a pair of driving rocker arms 10, 11 pivotally supported on the rocker shaft 9 for driving a pair of the intake valves of each cylinder and a free rocker arm 12 located between the pair of the driving rocker arms 10, 11 and also pivotally supported on the rocker shaft 9. The driving rocker arms 10, 11 are interlocked with a low-speed cam formed on a cam shaft for the intake valves and the free rocker arm 12 is interlocked with a high-speed cam formed on the cam shaft. The intake-side valve mechanism 8i further includes a changeover mechanism 13 through which both the driving rocker arms 10, 11 are detachably connected to the tree rocker arm 12.

In the above-described structural arrangement, when the driving rocker arms 10, 11 are disconnected from the free rocker arm 12, the intake valves are operated to open and close with a low-speed valve timing wherein the valve-open duration and the valve-lift amount are made relatively smaller by means of the low-speed cam. On the other hand, when the arms 10, 11, 12 are connected to each other, the intake valves are operated at a high-speed valve timing wherein the valve-open duration and the valve-lift amount are relatively larger.

The changeover mechanism 13 includes a first connecting pin 13a which can be engaged with and disengaged from the free rocker arm 12. The first connecting pin 13a is inserted in the first driving rocker arm 10 (i.e., one of the two driving rocker arms 10, 11). The changeover mechanism 13 further includes a second connecting pin 13b which can be engaged with and disengaged from the second driving rocker arm 11 (i.e., the other of the two-driving rocker arms 10, 11). The second connecting pin 13b is inserted in the free rocker arm 12. The mechanism 13 further has a restriction pin 13d urged towards the free rocker arm 12 by a spring 13c inserted in the second driving rocker arm 11.

A hydraulic chamber 13e is formed in the first driving rocker arm 10 so as to provide an oil pressure to push the first connecting pin 13a towards the free rocker arm 12. The hydraulic chamber 13e is communicated with an oil supplying passage 14 formed in the rocker shaft 9. When the hydraulic chamber 13e is charged with a hydraulic oil through the oil-supplying passage 14, the first connecting pin 13a becomes engaged with the free rocker arm 12, and is pushed by the first connecting pin 13a. Then, the second connecting pin 13b engages with the second driving rocker arm 11 so that both the driving rocker arms 10, 11 and the free rocker arm 12 are connected to each other to change the valve timing to a high-speed level. On the other hand, when oil pressure in the hydraulic chamber 13e is lowered, the second and the first connecting pins 13a, 13b are urged by the spring 13c through the restriction pin 13d, and are thus pushed back into the free rocker arm 12 and the first driving rocker arm 10, respectively, so as to disconnect both the driving rocker arms 10, 11 from the free rocker arm 12, thereby changing the valve timing to a low-speed level.

Then, an oil passage 15 for supplying oil from an oil pump (not shown) is connected to the oil supplying passage 14 through a changeover valve 16 attached to an end portion of the cylinder head. Consequently, when a spool type valve body 16a of the changeover valve 16 is positioned at the upper closed position, an inlet port 16b communicated with the oil passage 15 through an oil filter 17 and an outlet port 16c communicated with the oil supplying passage 14 may be communicated with each other only through an orifice 16d. At this time, the outlet port 16c is communicated with a drain port 16e which opens in the upper space in the cylinder head resulting in the decrease of the oil pressure in the oil supply passage 14. When the spool type valve body 16a is shifted to the lower open position, inlet port 16b and the outlet port 16c are communicated with each other through an annular groove provided in the spool type valve body 16a, while the outlet port 16c becomes disconnected from the drain port 16e so as to increase the oil pressure in the oil supplying passage 14.

The spool type valve body 16a is arranged in such a manner that the changeover thereof to the open position is carried out an against the urging force of a spring 16f by pilot which is inputted through a pilot oil passage 18 branching out from the inlet port 16b. The pilot oil passage 18 is provided with a normally closed type electromagnetic valve 19. An electric current energizing a solenoid 19a of the electromagnetic valve 19 is controlled by output signal VTS from the electronic control circuit 7, as shown in FIG. 1. When the electromagnetic valve 19 is opened due to the energization of the solenoid 19a, the spool type valve body 16a is turned to its open position so that the valve timing is changed over to a high-speed level. When the electric current for energizing the solenoid 19a is stopped so as to close the electromagnetic valve 19, the spool type valve body 16a is changed over to the closed position so that the valve timing is changed over to a low-speed level.

Moreover, in order to confirm the changeover operation of the spool type valve body 16a, a hydraulic switch 20 is provided on a housing 16g for the changeover valve 16 for detecting oil pressure at the outlet port 16c and for being turned on when the detected oil pressure is low, and for being turned off detected oil pressure is high.

In reference to FIG. 2, reference numeral 21 denotes a lubricant passage of the valve mechanism, reference number 22 designates a lubricant passage of the valve mechanism for the high-speed valve timing operation, and reference number 23 denotes a cam holder.

The above-described valve timing changeover means and oil passage arrangement are not particularly different from those disclosed in the Japanese Utility Model Registration Application No. 63-82588, filed on June 22, 1988 by the applicants of the present invention so that any further detailed explanation thereof is omitted.

Inputted into the electronic control circuit 7 are engine revolution speed (Ne) signals from an engine revolution speed sensor, throttle opening-degree ($\Theta$ th) signals from a throttle opening sensor 24, intake negative pressure ($P_B$) signals and intake temperature (TA) signals, respectively, from a pressure sensor 25 and a temperature sensor 26 (both of which are connected to the intake passage 2 downstream of the throttle valve 5), water temperature (TW) signals from a water temperature sensor 27, vehicle speed (V) signals from a vehicle speed sensor, signals from the hydraulic switch 20, and $O_2$ signals from an oxygen concentration sensor 28 provided in the exhaust passage 3. In case of an automatic transmission car, parking (P) and neutral (N) signals are additionally inputted into the electronic control circuit 7 from a shift lever position switch. Based on the operating condition determined from these signals, an appropriate fuel injection control and a suitable valve timing selection are carried out.

Furthermore, the fuel supply to the engine is stopped in the deceleration operation range wherein the intake negative pressure is lower than the no-load reference value (i.e., closer to vacuum) which is set somewhat lower than the no-load $P_B$ characteristic. In the low-load operation range wherein the intake negative pressure falls between the no-load reference value and the low-load reference value which is set somewhat higher than the no-load $P_B$ characteristic. In the low-load operation range, the fuel supply quantity is decreased so as to make the air/fuel ratio of the mixture somewhat leaner than the theoretical air/fuel ratio.

Figure 3:
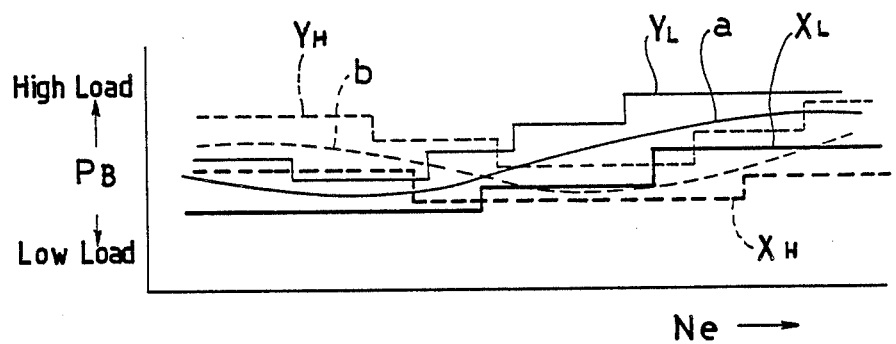
FIG. 3 is a diagram showing no-load $P_B$ characteristics and operation ranges for correcting fuel supply to the engine.
Figure 4:
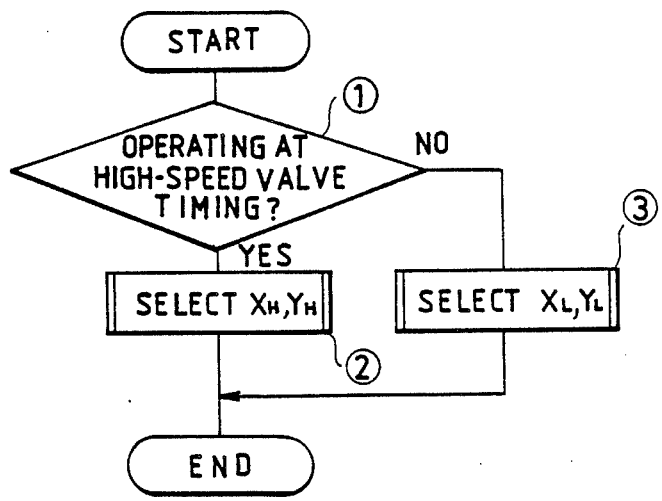
FIG. 4 is a flowchart showing the routine for changing the operation range for correcting the fuel supply.

It is noted that the no-load $P_B$ characteristic differs between the operation with the low-speed valve timing and the operation with the high-speed valve timing. Accordingly, the no-load reference value $X_L$ and the low-load reference value $Y_L$, both for the low-speed valve timing operation, are set in conformity with the no-load $P_B$ characteristic of the low-speed valve timing operation. The $P_B$ characteristic is represented by the curve a in FIG. 3 while the no-load reference value $X_H$, and the low-load reference value $Y_H$, both for the high-speed valve timing operation, are set in conformity with the no-load $P_B$ characteristic of the high-speed valve timing operation. The $P_B$ characteristic is represented by the curve b in FIG. 3. The reference values $X_L$, $Y_L$, $X_H$, $Y_H$, are stored in the electronic control circuit 7 so that the reference values $X_L$, $Y_L$ for the low-speed valve timing operation, and the reference values $X_H$, $Y_H$ for the high-speed valve timing operation may be selected in accordance with the program shown in FIG. 4.

More specifically, it is initially determined or judged at step 1 whether or not the engine is currently operating at the high-speed valve timing. If the engine is found operating at the high-speed valve timing, the program is advanced to step 2 where the reference values $X_H$, $Y_H$ for the high speed valve timing operation are selected as reference values for use in the fuel injection control routine of the program. In the fuel injection control routine, the $X_H$ and $Y_H$ values corresponding to the current revolution speed of the engine are compared with the current intake negative pressure $P_B$. When $P_B \leq X_H$, the fuel supply to the engine is stopped. When $X_H < P_B \leq Y_H$, the fuel supply quantity for the engine is then decreased.

On the other hand, if in step 1 it is judged or determined that the engine is not operating at high-speed valve timing (i.e., a "NO" at step 1) as the engine is operating at the low-speed valve timing, the program is advanced to step 3 where a processing is performed for selecting the reference values $X_L$, $Y_L$ for the low-speed valve timing operation. When $P_B \leq X_L$, the fuel supply to the engine is stopped. When $X_L < P_B \leq Y_L$, the fuel su-ply quantity is decreased.

While the invention has been particularly shown and described in reference to preferred embodiments thereof, it will be understood by those skilled in the art that changes in form and details may be made therein without departing from the spirit and scope of the invention.

What is claimed is:

1. A fuel control apparatus for use in an engine having a valve-timing changing means capable of changing at least one of a valve opening-closing timing and a valve-lift amount for a valve on at least one of an intake side and an exhaust side, said fuel control apparatus for said engine comprising:
    a judgement means for judging whether or not an operating state of said engine has entered a predetermined operation range determined by an engine load and a revolution speed of said engine;
    a correction means for correcting a fuel supply to said engine when said operating state of said engine has entered said predetermined operation range; and
    a means for changing said predetermined operation range in accordance with a change of at least one of said valve opening-closing timing and said valve-lift amount.

2. The fuel control apparatus for said engine according to claim 1, wherein said valve timing changing means is for changing over in a step-wise manner at least one of said valve opening-closing timing and said valve-lift amount.

3. The fuel control apparatus for said engine according to claim 1, wherein said predetermined operation range is a deceleration operation range of said engine, and wherein said correction means is for stopping said fuel supply to said engine.

4. The fuel control apparatus for said engine according to claim 1, wherein said predetermined operation range is a low-load operation range in which the engine load is approximately greater than in said deceleration operation range, and wherein said correction means is for decreasing said amount of fuel supply to said engine.

* * * * *